Aug. 30, 1932.  E. C. CROWTHER  1,874,462
LOCK WASHER ASSEMBLY
Filed April 10, 1930
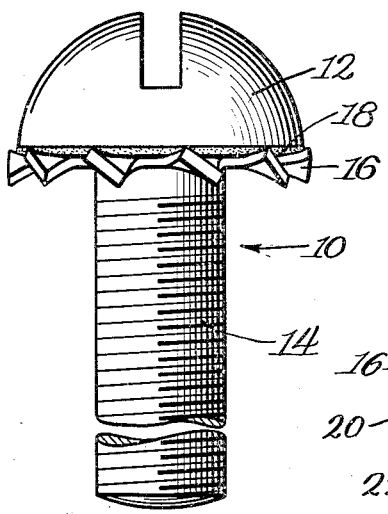
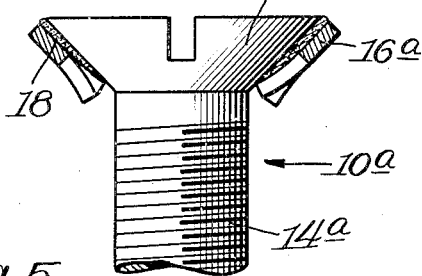
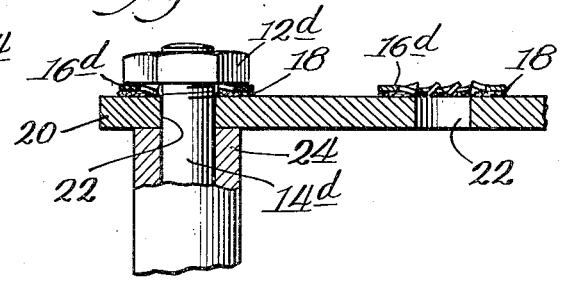
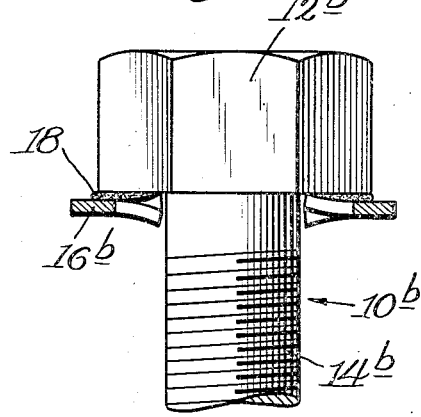
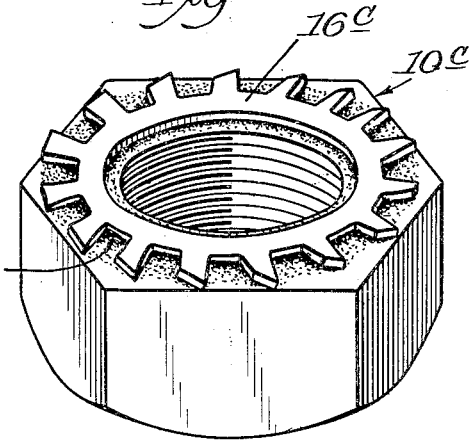
Inventor:
Edmond C. Crowther
By Cheever, Cox & Moore
Attys.

Patented Aug. 30, 1932

1,874,462

UNITED STATES PATENT OFFICE

EDMOND C. CROWTHER, OF OAK LANE, PENNSYLVANIA, ASSIGNOR TO SHAKEPROOF LOCK WASHER COMPANY, OF CHICAGO, ILLINOIS, A CORPORATION OF DELAWARE

LOCK WASHER ASSEMBLY

Application filed April 10, 1930. Serial No. 443,050.

My invention relates generally to screw and lock washer assemblies, and particularly to the assembly of a lock washer with a screw head or nut.

In certain industries such as the automobile, radio, and other industries, lock washers are being used very extensively. It is common practice in manufacturing such devices as automobiles, radios, and the like to employ what might be called a progressive assembly of parts. That is to say, the assembly of parts is begun in one part of the shop and those parts are slowly advanced, while other parts are assembled therewith until the final assemblage results at another point in the shop. In carrying out this method of assembly, it has been the practice in many instances to employ a great number of workers for the purpose of loosely pre-assembling lock washers on screws and the like. Parts thus assembled by the workers are placed in a tray to be used by the workmen who apply the screws in position upon the work piece. By pre-assembling I mean that the screw is threaded through the lock washer, thereby loosely positioning the lock washer on the screw. In view of the fact that the washer is loosely positioned upon the screw, care must be exercised so as not to subject the screw and lock washer assemblies to any undue disturbance. If this care is not exercised, the lock washers are subjected to the potential hazard of becoming dislodged from their companion screws. In fact, such dislodgment might take place as the result of merely shifting a tray of assembled parts from one position to another in the shop. In other words, lock washers loosely assembled upon a screw as above set forth do not enable those assembled units to be kept in stock for use at any time, because the lock washers are not secured in a fixed position to the screw head.

It is one of the primary objects of my present invention to eliminate difficulties such as those mentioned above, as well as other disadvantages which have been experienced in securing lock washers in position upon a work piece, and to this end I propose to provide a simple and exceedingly convenient screw and lock washer assemblage, in which the lock washer is secured in position upon the screw head, nut, or other element which is to be applied to the work piece.

More specifically, it is an object of my invention to provide an assemblage of parts as above set forth, in which the lock washer is secured to its complementary screw head or nut by means interposed between the surface of the head or bolt and the adjacent surface of the lock washer.

Still more specifically, my invention contemplates the use of an adhesive or cementing means for securing a lock washer in a fixed pre-assembled position upon a head or nut, whereby the assembled parts may be kept in stock as units in readiness for use at any time, and may be shifted or shipped from one place to another without the inherent danger of becoming separated.

These and numerous other objects and advantages will be more apparent from the following detailed description when considered in connection with the accompanying drawing, wherein—

Figure 1 is a side elevational view of a screw and lock washer assembly, disclosing the manner in which a lock washer of the external twisted prong type may be conveniently secured in position against the underside of the round head of the screw;

Figure 2 discloses still another practical application of the invention, said figure showing the manner in which a lock washer of the frusto-conical type may be secured to a complementary frusto-conical screw head by means of a suitable adhesive or cementing material;

Figure 3 is still another representation of a screw and lock washer assembly contemplated by my invention, said view disclosing a bolt head equipped with a lock washer of the internal twisted tooth type;

Figure 4 is a perspective view of an assembly comprising a lock washer of the twisted prong type secured upon the face of a nut; and Figure 5 discloses the manner in which a lock washer may be secured to a plain surface of a plate or the like as distinguished from the surface of a rotatable member such as a screw head or nut.

Referring now to the drawing more in detail wherein like numerals are employed to designate similar parts throughout the various figures, it will be seen that my invention is applicable in connection with various types of threaded members such as screws, bolts, nuts, and so forth. To clearly set forth these advantages I have shown various lock washers of the twisted tooth type secured to elements in accordance with the teachings of my invention. Figure 1, for example, discloses an assemblage which includes a threaded element or screw which I have designated generally by the numeral 10. This screw is of a conventional type having a round head 12 and a threaded section 14. Positioned beneath and against the underside or surface of the head 12 is a lock washer 16 of the twisted tooth type. This lock washer is secured in position against the head 12 by means of an adhesive, such as cement, solder, or other suitable material. This material is interposed between the surface of the head and the adjacent surfaces of the body portion and teeth of the washer 16, and thus serves as an effective means for securing said washer in a fixed position upon the screw. Cement, solder, or other adhesive material provides a very effective and conveniently applicable binding, it being only necessary to apply a small portion of the binder to one of the parts and then bring said parts into juxtaposition.

In Figure 2 I have shown a screw designated generally by the numeral 10a, which is formed with the usual frusto-conical head 12a and a threaded section 14a. A frusto-conical lock washer of the internal twisted tooth type 16a is secured against the tapered surface of the screw head by means of the binder 18. This merely discloses another practical application of my invention.

In Figure 3 I have shown a screw or bolt designated generally by the numeral 10b, which is provided with a head 12b and a threaded section 14b. Secured adjacent the underside of the head 12b by means of the binding material 18 is a flat type lock washer 16b of the internal twisted tooth type.

In Figure 4 I have disclosed the application of the invention to threaded elements such as nuts. In that figure I have shown a nut designated generally by the numeral 10c, and secured in juxtaposition with respect to one face of the nut is a lock washer 16c, said lock washer being of the external twisted tooth type. This lock washer is secured in position upon the face of the nut by means of the binding material 18. Thus it will be apparent that, by means of my invention, which indeed is a practical one, lock washers of various types, shapes, and forms may be secured to complementary parts in a very convenient manner. My invention eliminates the necessity of employing any mechanical devices or structural configuration for securing the lock washer in place. In other words, the assembled parts may be of conventional design, and no additional locking elements, such as pins, cleats, and the like, need be employed to secure the parts together. In assembling such elements as lock washers with their complementary parts it is desirable from the standpoint of economy to reduce to a minimum the work which is required to secure said parts together. Obviously, my invention meets this particular need, inasmuch as it only requires the application of a small quantity of binding material to the parts in order to secure said parts together.

In instances where it is desirable to obtain relative movement between the lock washer and the parts between which it is clamped, it is only necessary to employ a binding material which, when the washer is clamped against the work piece, will yield so as to permit slippage between the head of the screw and the washer. In other words, the binding material may serve only as a means for maintaining the washer in proper preassembled relation prior to its being clamped against the work piece. If a fixed mechanical or other rigid connection were made between the lock washer and the head of a screw, the above mentioned advantage could not be obtained. The cost of preassembling elements in the manner described is very small, and the parts may be assembled with a minimum amount of effort and skill on the part of the worker.

In Figure 5 I have disclosed the manner in which a lock washer 16d may be secured to a plain surface of a plate 20 or other suitable member such as a terminal member. For example, it may be desirable to have a lock washer prepositioned in registration with an aperture 22 in the plate, which aperture is adapted to receive the threaded portion of a bolt 14d. This bolt may serve when a nut 12d is screwed thereon to clamp the plate 20 in position upon a binding post or other suitable member 24. In such instances the binding material 18 such as glue, cement or the like may be applied to the surface immediately surrounding the aperture 22 or to the lock washer 16d and the parts then brought together. This feature of the invention has a very practical application in instances where individual terminal members, which are not provided with integral twisted teeth, are secured against rotation by means of a lock washer. These terminal members which would correspond to the plate 20, may be equipped with lock washers as described above.

The binding material 18 is particularly effective in connection with twisted tooth types of lock washers, because in such instances the material is adapted to extend into the spaces between the washer teeth and thereby function more effectively as a binder. Although I have disclosed particular types of lock washers and particular types of screws and nuts, it should be understood that the invention is by no means limited to such structures, but is adaptable for use in any instance where it is desirable to preassemble washers and complementary elements. I do not propose to limit myself to the use of any particular kind of binding material, but it will be apparent that various forms of cements, solders, and other adhesives may be employed in carrying out the teachings of my invention.

Having thus described my invention what I claim as new and desire to secure by Letters Patent is:

1. A lock washer assembly including a workpiece having a rotary clamping surface, and a lock washer adhesively secured in operative relation to said surface.

2. A lock washer assembly including a workpiece having a rotary clamping surface, a lock washer operatively associated with said surface, and binding material for securing said washer to said surface, said binding material being of such a strength that it will lose its binding effectiveness when a rotary clamping force is applied to the washer.

In witness whereof, I have hereunto subscribed my name.

EDMOND C. CROWTHER.